(12) United States Patent
Deane

(10) Patent No.: US 7,369,724 B2
(45) Date of Patent: May 6, 2008

(54) APPARATUS AND METHOD FOR AN IMPROVED LENS STRUCTURE FOR POLYMER WAVE GUIDES WHICH MAXIMIZES FREE SPACE LIGHT COUPLING

(75) Inventor: Peter Deane, Moss Beach, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/542,816

(22) Filed: Oct. 3, 2006

(65) Prior Publication Data

US 2008/0080811 A1    Apr. 3, 2008

(51) Int. Cl.
*G02B 6/32* (2006.01)
*G02B 6/26* (2006.01)
*G02B 6/42* (2006.01)
*G06F 3/042* (2006.01)

(52) U.S. Cl. ............................. 385/33; 385/31; 385/38; 345/173; 345/175; 345/176

(58) Field of Classification Search ................ 345/175, 345/176; 385/33
See application file for complete search history.

(56) References Cited

U.S. PATENT DOCUMENTS

| | | |
|---|---|---|
| 3,832,028 A | 8/1974 | Kapron |
| 4,262,996 A | 4/1981 | Yao |
| 4,367,916 A | 1/1983 | Mottier et al. |

(Continued)

FOREIGN PATENT DOCUMENTS

EP    0569181    11/1993

(Continued)

OTHER PUBLICATIONS

Chen, R. T. "Polymer-Based Photonic Integrated Circuits", Optics and Laser Technology, Elsevier Science Publishers BV, Amsterdam, NL, vol. 25, No. 6, Dec. 1, 1993, pp. 347-365.

(Continued)

*Primary Examiner*—Frank G. Font
*Assistant Examiner*—Ryan Lepisto
(74) *Attorney, Agent, or Firm*—Beyer Weaver LLP

(57) ABSTRACT

A polymer waveguide assembly. The assembly includes a polymer waveguide have a plurality of waveguide cores and an associated plurality of lenses respectively. The assembly also includes a molded lens structure having a support region, a primary refractive surface and a secondary refractive lens. The polymer waveguide is positioned onto the support surface of the molded lens structure so that the waveguide lenses are in optical alignment with the primary refractive lens and the secondary refractive lens of the molded waveguide structure. The lenses of the polymer waveguide are capable of collimating in the X and Y directions respectively. The primary refractive lens and the secondary refractive lens are both capable of collimating light in the Z direction. With this arrangement, a substantial; portion of the light passing through the secondary lens toward the waveguide cores is within the acceptance angle of the plurality of waveguides lenses respectively. The secondary lens thus creates a shallow angle of convergence relative to the input of the plurality of lenses of the waveguide. As a result, issues caused by misalignment are minimized and optical coupling is improved.

19 Claims, 7 Drawing Sheets

U.S. PATENT DOCUMENTS

| | | | |
|---|---|---|---|
| 4,440,468 A | 4/1984 | Auracher et al. | |
| 4,746,770 A | 5/1988 | McAvinney | |
| 4,916,308 A | 4/1990 | Meadows | |
| 5,414,413 A | 5/1995 | Tamaru et al. | |
| 5,432,877 A | 7/1995 | Sun et al. | |
| 5,540,612 A | 7/1996 | Mendez et al. | |
| 5,604,835 A | 2/1997 | Nakamura et al. | |
| 5,719,973 A | 2/1998 | Monroe et al. | |
| 5,850,498 A | 12/1998 | Shacklette et al. | |
| 5,914,709 A | 6/1999 | Graham et al. | |
| 6,181,842 B1* | 1/2001 | Francis et al. | 385/14 |
| 6,341,189 B1 | 1/2002 | Deacon | |
| 6,351,260 B1 | 2/2002 | Graham et al. | |
| 6,456,766 B1 | 9/2002 | Shaw et al. | |
| 6,470,130 B1 | 10/2002 | Walker et al. | |
| 6,538,644 B1 | 3/2003 | Muraoka | |
| 6,555,288 B1 | 4/2003 | Xu et al. | |
| 7,099,553 B1 | 8/2006 | Graham et al. | |
| 2002/0030668 A1 | 3/2002 | Hoshino et al. | |
| 2002/0118907 A1 | 8/2002 | Sugama et al. | |
| 2003/0035632 A1 | 2/2003 | Glebov et al. | |
| 2003/0174943 A1 | 9/2003 | Caracci et al. | |
| 2003/0203315 A1 | 10/2003 | Farahi et al. | |
| 2003/0231851 A1 | 12/2003 | Rantala et al. | |
| 2004/0017974 A1 | 1/2004 | Balch et al. | |
| 2004/0076382 A1 | 4/2004 | Saia et al. | |
| 2005/0271326 A1* | 12/2005 | Luo | 385/43 |
| 2006/0001653 A1* | 1/2006 | Smits | 345/176 |
| 2006/0002655 A1* | 1/2006 | Smits | 385/31 |
| 2006/0088244 A1* | 4/2006 | Kukulj et al. | 385/33 |
| 2006/0188196 A1* | 8/2006 | Charters et al. | 385/33 |

FOREIGN PATENT DOCUMENTS

| | | |
|---|---|---|
| EP | 1271211 | 1/2003 |
| JP | 200078349 | 3/2000 |
| JP | 2003177264 | 6/2003 |
| WO | WO02/095668 | 11/2002 |
| WO | WO03/071323 | 8/2003 |

OTHER PUBLICATIONS

International Search Report and Written Opinion for related PCT application PCT/US2005/019556, mailed on Aug. 29, 2005.
International Search Report and Written Opinion for related PCT Application PCT/US04/10297, mailed on Sep. 13, 2004.
U.S. Appl. No. 10/758,759, filed Jan. 15, 2004.
U.S. Appl. No. 10/817,564, filed Apr. 1, 2004.
U.S. Appl. No. 10/861,251, filed Jun. 4, 2004.
International Search Report and Written Opinion for related PCT application PCT/US2005/019560, mailed on Mar. 22, 2006.
International Search Report for related PCT application PCT/US2005/019480, mailed on Nov. 22, 2005.
Office Action in U.S. Appl. No. 10/862,003, mailed Dec. 14, 2007.
Office Action in U.S. Appl. No. 10/861,251, mailed Jan. 16, 2008.
Office Action in U.S. Appl. No. 10/817,564, mailed Sep. 21, 2007.
Office Action in U.S. Appl. No. 10/758,759, mailed Jan. 25, 2008.

* cited by examiner

APPARATUS AND METHOD FOR AN IMPROVED LENS STRUCTURE FOR POLYMER WAVE GUIDES WHICH MAXIMIZES FREE SPACE LIGHT COUPLING

BACKGROUND OF THE INVENTION

1. Field of the Invention

The present invention relates generally to polymer waveguides used for light generation and reception in touch screen displays, and more particularly, to an improved lens structure for free space optical systems which maximizes the free space light coupling between transmit and receive waveguides.

2. Description of the Related Art

User input devices for data processing systems can take many forms. Two types of relevance are touch screens and pen-based screens. With either a touch screen or a pen-based screen, a user may input data by touching the display screen with either a finger or an input device such as a stylus or pen.

One conventional approach to providing a touch or pen-based input system is to overlay a resistive or capacitive film over the display screen. This approach has a number of problems. Foremost, the film causes the display to appear dim and obscures viewing of the underlying display. To compensate, the intensity of the display screen is often increased. However, in the case of most portable devices, such as cell phones, personal digital assistants, and laptop computers, the added intensity requires additional power, reducing the life of the battery in the device. The films are also easily damaged. In addition, the cost of the film scales dramatically with the size of the screen. With large screens, the cost is typically prohibitive.

Another approach to providing touch or pen-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either a finger or pen, the interruptions in the light beams are detected by the corresponding X and Y photodiodes on the opposite side of the display. The data input is determined by calculating the coordinates of the interruptions as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

Yet another approach involves the use of polymer waveguides to both generate and receive beams of light from a single light source to a single array detector. The waveguides are usually made using lithographic processes. One type of known polymer waveguide is made by forming a bottom cladding layer over a substrate. A second polymer layer is next formed on the bottom polymer layer and patterned using photolithography to form waveguide cores and lenses. A third polymer layer is then formed over the lenses and waveguide cores. The first and third polymer layers have the same index of refraction N1, which is lower than the index of refraction N2 of the middle or second polymer layer.

In use, a first L-shaped waveguide is positioned on the X and Y transmitting sides of a display surface. A second L-shaped waveguide is positioned on the opposite or receiving X and Y sides of the display surface. The lenses of the first waveguide, which are coupled to a light source through the individual waveguide cores, are arranged to generate either a grid or lamina of collimated light across the display surface. The lenses of the second waveguide are optically coupled to each of the lenses on the transmit side of the display. When a data entry is made on the touch screen, using a finger or pointing instrument such as a pen or stylus, an interruption occurs in the grid or lamina of light. An optical sensor, coupled to the individual waveguide cores on the receive side, is able to detect the data entry based on the X, Y coordinates of the interruption.

For more details making and using polymer waveguides, see for example, U.S. application Ser. No. 10/861,251 entitled "Apparatus and Method for a Molded Waveguide for Use with Touch Screen Displays", filed Jun. 4, 2004, U.S. application Ser. No. 10/862,003 entitled "Waveguide With Three-Dimensional Lens" filed Jun. 4, 2004, U.S. Ser. No. 10/862,007 entitled "Techniques for Manufacturing a Waveguide with Three Dimensional Lens" filed Jun. 4, 2004, U.S. application Ser. No. 10/758,759 entitled "Hybrid Waveguide" filed Jan. 15, 2004, and U.S. application Ser. No. 11/498,356 entitled Apparatus and Method for Singulation of Polymer Waveguides Using Photolithography" filed Aug. 2, 2006, all assigned to the assignee of the present invention and each incorporated by reference herein for all purposes. The specification of U.S. application Ser. No. 11/498,356 is attached herewith as Appendix A.

Currently known polymer waveguides have only a single refractory lens surface provided at the end of each waveguide core. These lenses are typically two dimensional, meaning they are capable of collimating light in the only the X and Y planes. Since it is difficult to fabricate a three dimensional polymer lens using photolithography, current polymer waveguides do an inadequate job in collimating light in the Z plane. As a consequence, single lens optical waveguides have poor optical coupling in the Z plane.

To compensate for the poor coupling in the Z plane, a precision molded "vertical" lens is used in cooperation with polymer waveguide. The precision molded lens includes a support area to support the polymer waveguide. When positioned on the support, the vertical lens is optically aligned with the lenses on the waveguide. The combined polymer waveguide and vertical lens generates a free space optical beam directed and collimated in the Z as well and the X, Y planes.

Problems arise with the aforementioned arrangement due to alignment issues. The accurate projection (transmit) and coupling (receive) of the light from the transmit polymer waveguide to the receive polymer waveguide is critically influence by the accurate placement of transmit and receive waveguides relative to the focal point of the vertical lens. In other words, if the polymer waveguides are not precisely aligned with their respective vertical lenses, it may result in the loss of optical coupling between transmit and receive waveguides. For example if there a misalignment issues on the receiving end, then it is likely that the focal point of the vertical lens will fall outside the lenses of the polymer waveguide. The amount of light coupling will therefore be significantly reduced. As a general rule, a slight misalignment will often cause a rather dramatic loss of optical coupling or power at the receiving waveguide.

Accordingly, there is a need for a polymer waveguide assembly having a two lens vertical structure to collimate in the Z plane so light received in free space and exiting the two lenses is substantially within the acceptance angle of the waveguide, allowing a significantly lower sensitivity of optical coupling efficiency with waveguide alignment, thereby minimizing problems caused by misalignment and improving optical coupling.

SUMMARY OF THE INVENTION

The present invention is directed a polymer waveguide assembly. The waveguide assembly includes a polymer waveguide have a plurality of waveguide cores and an associated plurality of lenses respectively. The assembly also includes a molded lens structure having a support region, a primary refractive surface and a secondary refractive lens. The polymer waveguide is positioned onto the support surface of the molded lens structure so that the waveguide lenses are in optical alignment with the primary refractive lens and the secondary refractive lens of the molded waveguide structure. The lenses of the polymer waveguide are capable of collimating in the X and Y directions respectively. The primary refractive lens and the secondary refractive lens are both capable of collimating light in the Z direction. With this arrangement, a substantial; portion of the light passing through the secondary lens toward the waveguide cores is within the acceptance angle of the plurality of waveguides lenses respectively. The secondary lens thus creates a shallow angle of convergence relative to the input of the plurality of lenses of the waveguide. As a result, light received in free space and exiting the two lenses is substantially within the acceptance angle of the waveguide, allowing a significantly lower sensitivity of optical coupling efficiency with waveguide alignment, thereby minimizing problems caused by misalignment and improving optical coupling.

BRIEF DESCRIPTION OF THE DRAWINGS

The invention, together with further advantages thereof, may best be understood by reference to the following description taken in conjunction with the accompanying drawings in which.

In the figures, like reference numbers refer to like components and elements.

DETAILED DESCRIPTION OF THE INVENTION

Figure 1:
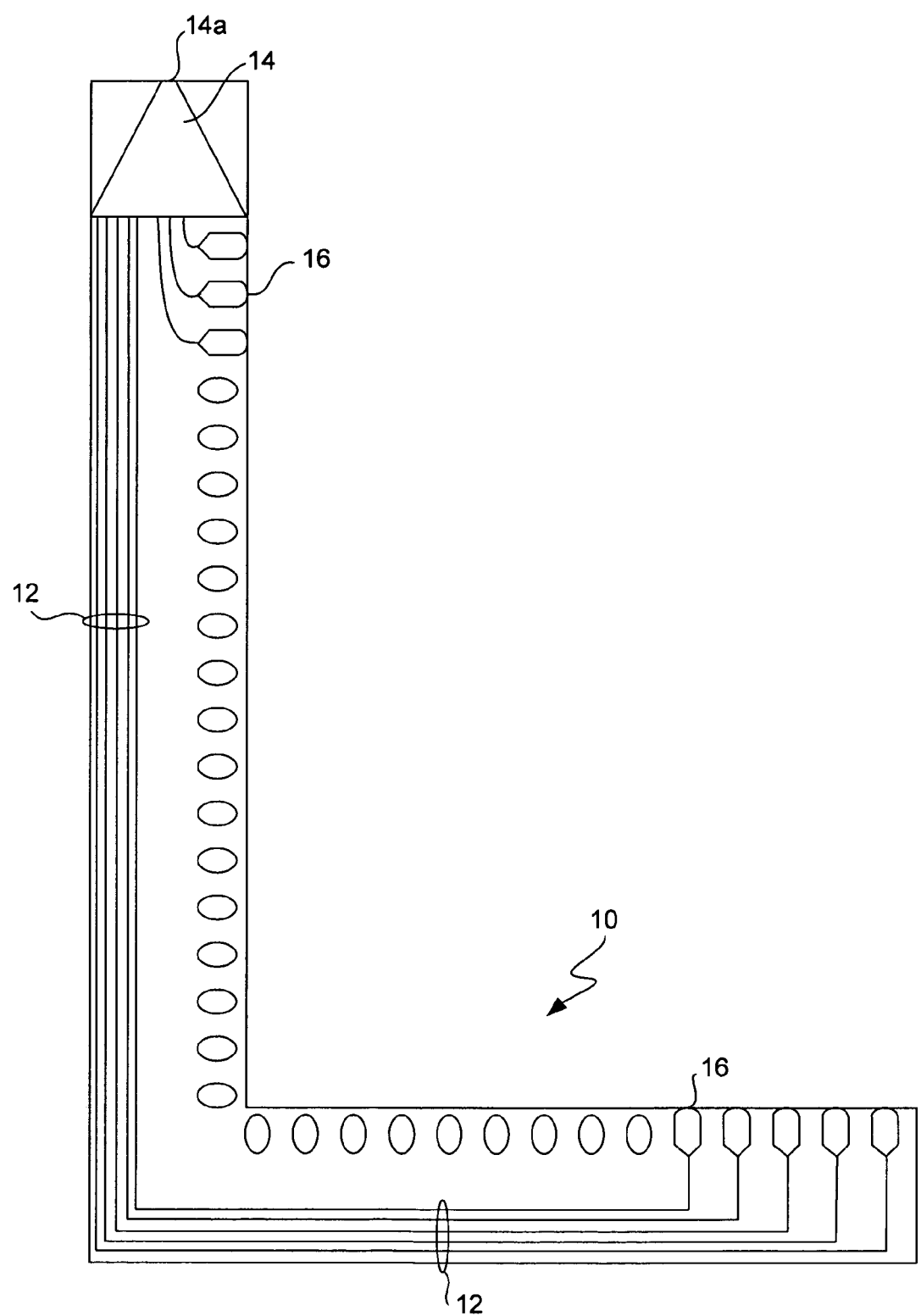
FIG. 1 is a polymer waveguide.

Referring to FIG. 1, a polymer waveguide 10 is shown. The waveguide 10 is an L-shaped member including a plurality of cores 12 that extend between an optical coupling end 14 of the waveguide 10 and a plurality of lenses 16 respectively (for the sake of simplicity, not all the cores 12 are illustrated). The optical coupling end 14 includes an expansion horn 14a, which, tapers to a single source. The individual lenses 16 are provided along the inner periphery of the waveguide 10. Each of the lenses 16 is optically coupled to one of the cores 12 which runs the length of the waveguide 10 and terminates at the optical coupling end 14.

In one embodiment, the polymer waveguide 10 is manufactured using photolithography. A first polymer cladding layer having an index of refraction N1 is formed on a substrate. A second polymer cladding layer, having an index of refraction N2, which is greater than N1, is formed over the first layer. The second polymer layer is patterned to form the individual cores 12 and lenses 16 using standard photolithography techniques. A third polymer layer having an index of refraction of N1 is formed over the patterned second layer. Cladding is therefore provided both above and below the individual cores 12 of the second layer. Since the cores 12 are made of a polymer having a higher index of refraction than the top and bottom layers, light is internally reflected within the cores 12. As a result, light can be transmitted through the cores 12.

In various embodiments, the first, second and third polymer layers are made from optically clear photopolymers, including, but not limited to Polysiloxanes, Polymethylmethacylates, epoxies, and other materials or a combination thereof. The substrate can be one of the following types of materials, including mylar, polycarbonate, PET, sheet film plastics, polymers photo-imageable polymers, release coated glass, release coated ceramics, release coated semiconductors, and other rigid and flexible materials. For more details on fabricating the polymer waveguide 10, see the above-mentioned pending applications, each incorporated by reference herein.

Figure 2:
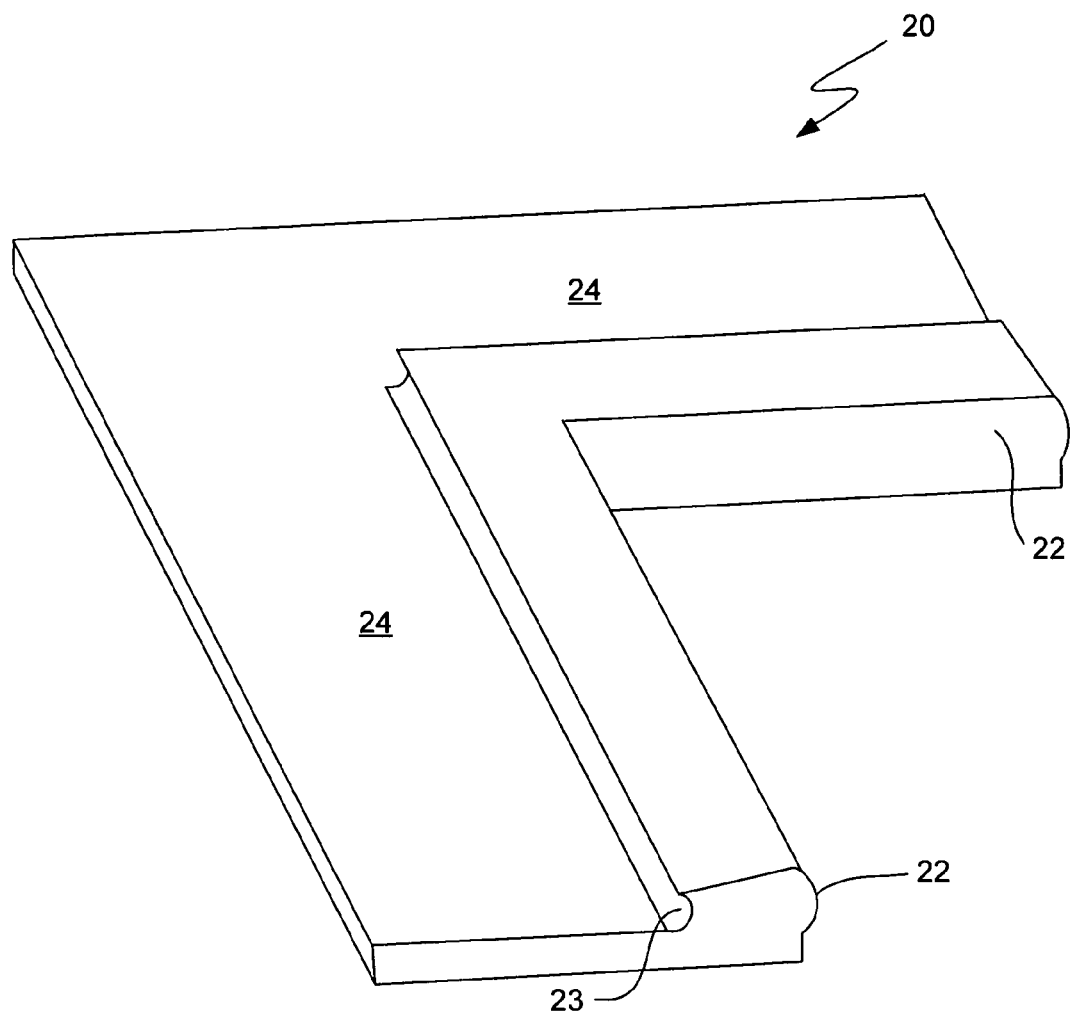
FIG. 2 is a molded lens structure according to the present invention.

Referring to FIG. 2, a precision molded lens structure 20 is shown. The molded lens 20 is also L-shaped and includes a primary refractive surface or lens 22, a secondary refractive surface or lens 23, and a support region 24. The secondary lens 23 is grooved shaped and runs the length of the L-shaped molded lens structure 20. Both lenses 22 and 23 are capable of collimated light in the Z direction. In various embodiments, the molded lens structure 20 can be fabricated using a number of known molding techniques, such as precision injection molding.

Figure 3:
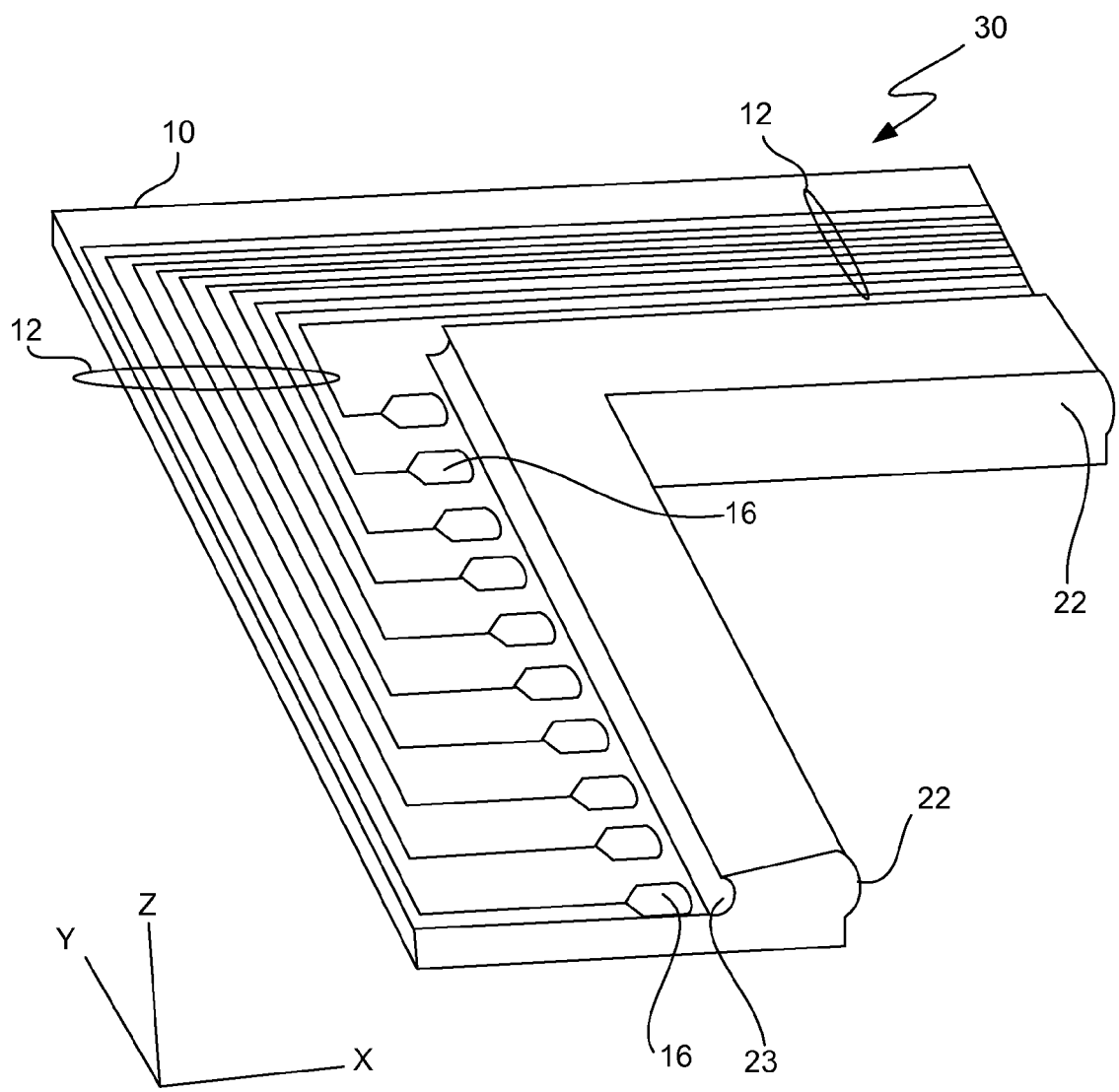
FIG. 3 is a polymer waveguide assembly including the polymer waveguide and molded lens structure according to the present invention.

Referring to FIG. 3, a polymer waveguide assembly 30 according to the present invention is shown. The assembly 30 includes the polymer waveguide 10 positioned onto the support region 24 of the molded lens structure 20. This arrangement creates, for each core 12, essentially a three-lens structure. The first lens 16 of the waveguide 10 is a two dimensional lens capable of collimating light in the X and Y directions. The second and third lenses 22 and 23 of the molded lens structure 20 collimate light in the Z direction.

Figure 4A:
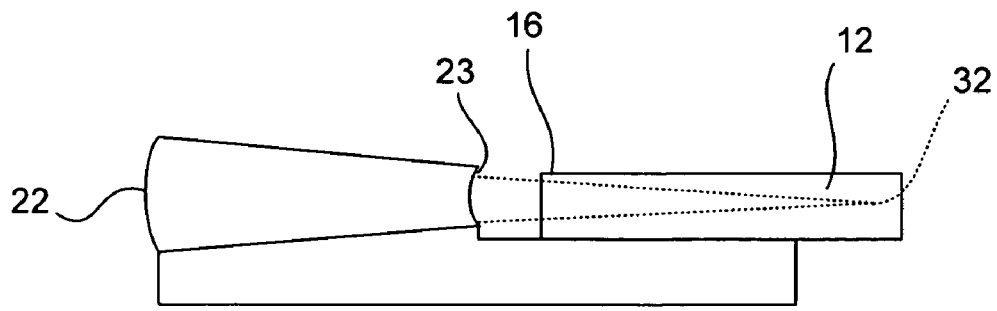
FIGS. 4A and 4B are cross sections of polymer have guide assemblies according to the present invention and the prior art respectively.
Figure 4B:
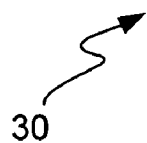
Figure 4B:
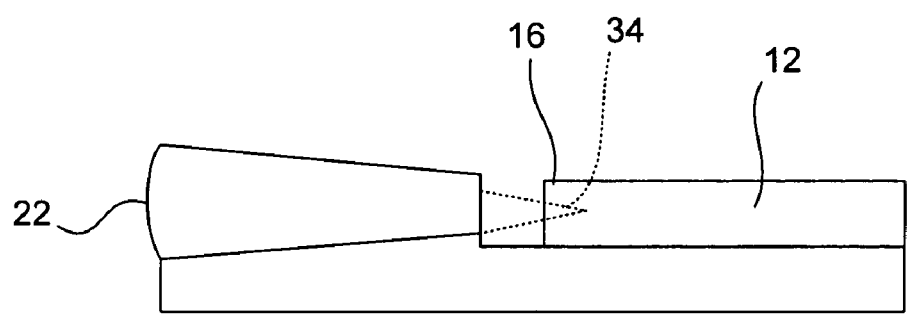

Referring to FIGS. 4A and 4B, cross sections of waveguide assembly of the present invention and a prior art molded waveguide assembly are shown respectively.

In FIG. 4A, a waveguide 12 is shown positioned on the support region 24 of a molded waveguide structure 20. The secondary lens 23 of the molded lens structure 20 defines a curved refractory surface that creates a focal point 32 well beyond the lens 16 of the waveguide 12. The secondary lens 23 thus creates a shallow angle of convergence relative to the lens 16 at the input of the waveguide 12. As a result, when the assembly is configured as a receive waveguide, a significant portion of the light passing through the lenses 22 and 23 is within the acceptance angle of the lens 16 of waveguide 12. Thus with this arrangement, alignment is significantly less critical. Lens 16 and the waveguide 12 receive more light, even if there are alignment issues, from the lenses 22 and 23. As a result, optical coupling is significantly improved.

In contrast with a prior art waveguide assembly of FIG. 4B, the molded waveguide structure 20 includes only a single vertical lens 22. Without the second lens 23, the focal point 34 is at or near the lens 16 of the waveguide 12. Optical coupling is therefore highly dependent on assembly tolerances without the lens 23. If the polymer waveguide 12 and lens 16 are positioned out of alignment with regard to the lens 22 of structure 20, then optical coupling is significantly degraded.

When the waveguide assembly 30 is configured as a transmit waveguide, light exits the waveguide 12 and radiates outward. The radiating light passes through the secondary lens 23 at right angles to its surface. The primary lens 22 then collimates the light, creating either a beam or lamina of light in the free space adjacent the assembly 30.

In one embodiment, the primary lens 22 has a height of approximately 1 millimeter, the secondary lens 23 has a height of approximately 0.2 millimeters, and the two lenses are spaced apart approximately 1.5 to 3.0 millimeters. With the secondary lens 23, the height or thickness of the polymer waveguide 10 can be increased, for example 0.2 millimeters. The present invention thus allows substantially thicker waveguide cores, using the same material, as otherwise possible using a single refractive lens design on the molded substrate. It should be noted that the above dimensions are exemplary. In no way should they be construed as limiting the present invention. The polymer waveguide assembly of the present invention as described herein can be made with dimensions larger or smaller than those specified herein.

Figure 5:
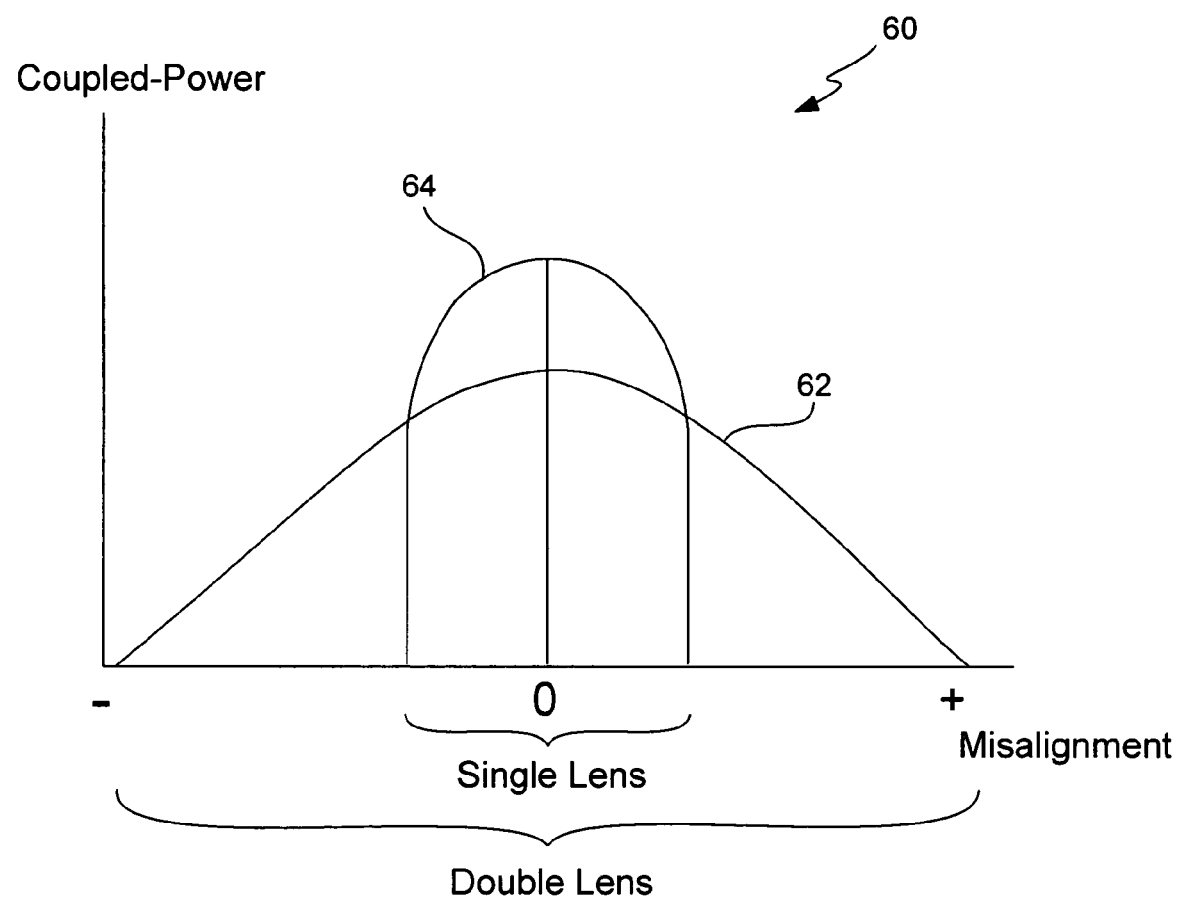
FIG. 5 is a power distribution curve for the two-lens waveguide structure according to the present invention.

Referring to FIG. 5, a power distribution curve for the polymer waveguide assemblies shown in FIGS. 4A and 4B is shown. The distribution curve 60 shows the received power distribution along the vertical axis versus the degree of misalignment in the positive (+) and negative (−) directions. With the benefit of the primary lens 22 and the secondary lens 23, the power intensity distribution curve 62 of the assembly in FIG. 4A is relatively high over a wide range of misalignment errors in both the positive and negative directions. In contrast with only the primary lens 22, the received power intensity distribution curve 64 of the prior art assembly of FIG. 4B is higher with minimal alignment problems, but experiences a dramatic drop-off over a relatively narrow range of positive and negative alignment ranges. The design of the present invention therefore substantially corrects for any errors due to misalignment of the lenses of the transmitting and receiving waveguides.

Figure 6:
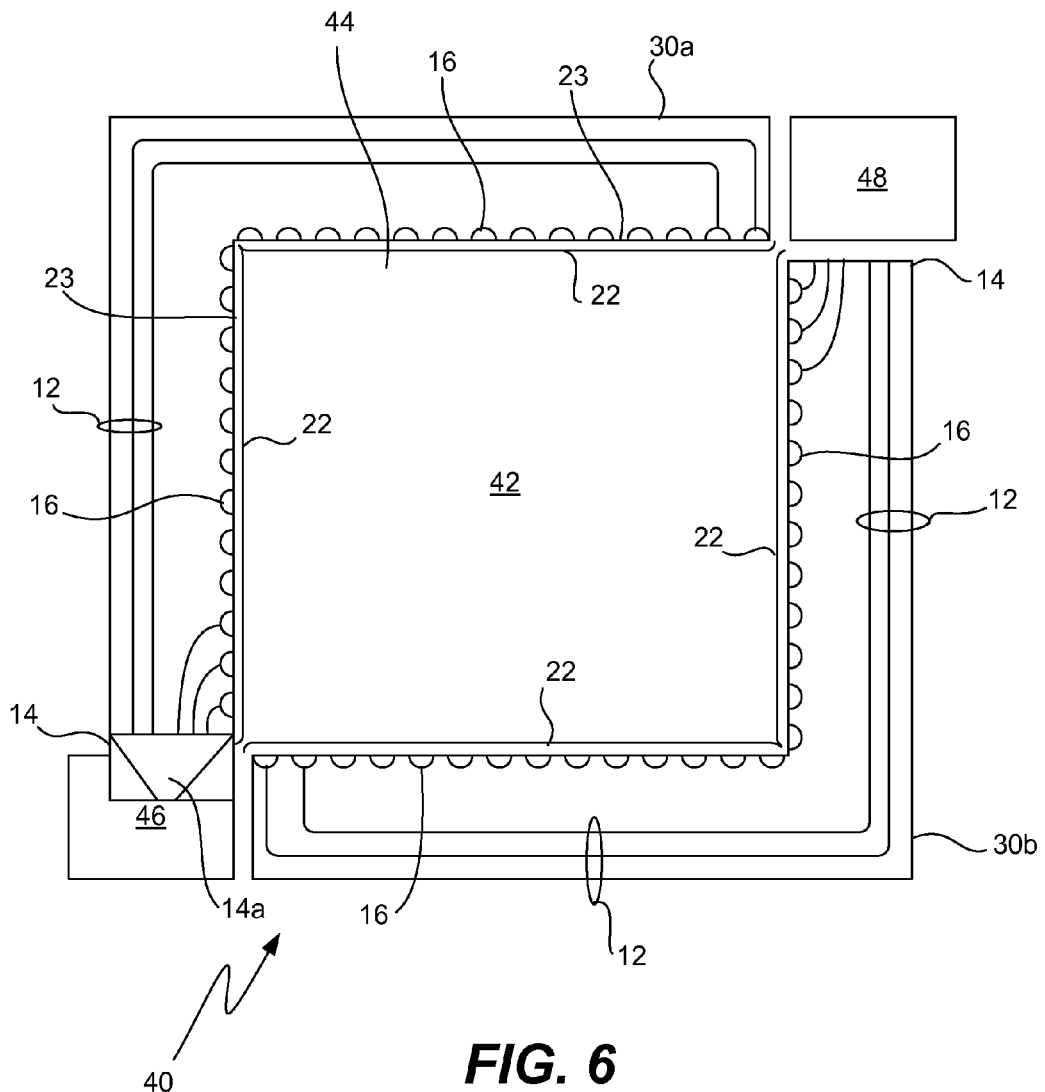
FIG. 6 is a touch screen display device using the two-lens polymer waveguide structures according to the present invention.

Referring to FIG. 6, a touch screen data input display device using the polymer waveguide assembly 30 is shown. The display device 40 includes a grid or lamina of light 42 adjacent to a touch screen display 44. A first waveguide assembly 30A is positioned on the left and upper sides of the display 44. A second waveguide assembly 30B is positioned on the right and bottom sides of the display 44. A light source 46, such as a laser or LCD, is optically coupled to the cores 12 of the waveguide structure 30A through the expansion horn 14a. A light or image processor 48 is optically coupled to the cores 12 of the waveguide structure 30B. With this configuration, the waveguide structure 30A is a transmit waveguide, whereas the waveguide structure 30B is a receive waveguide. It should be noted that the transmit waveguide structures 30A and are structurally the same. Each can be used as either transmit or receive waveguide, depending which side of the display screen it is positioned.

During operation, light from the light source 46 is transmitted down the cores 12 of the waveguide structure 30A. The light exits the lenses 16 and 22 of the waveguide structure 30A, resulting in the grid or lamina of light 42 adjacent the surface of display 44. On the receive side, the lenses 22 and 16 of the waveguide structure 30B are optically coupled to the grid or lamina of light 42. When a user makes a data entry to the device 40 by touching the screen 44 using an input device, such as a finger, pen or stylus, an interrupt occurs in the grid or lamina of light 42. The optical processor 48 determines the data entry to the device based on the detected X and Y coordinates of the interrupt as received through the cores 12 of the waveguide structure 30B.

Figure 7:
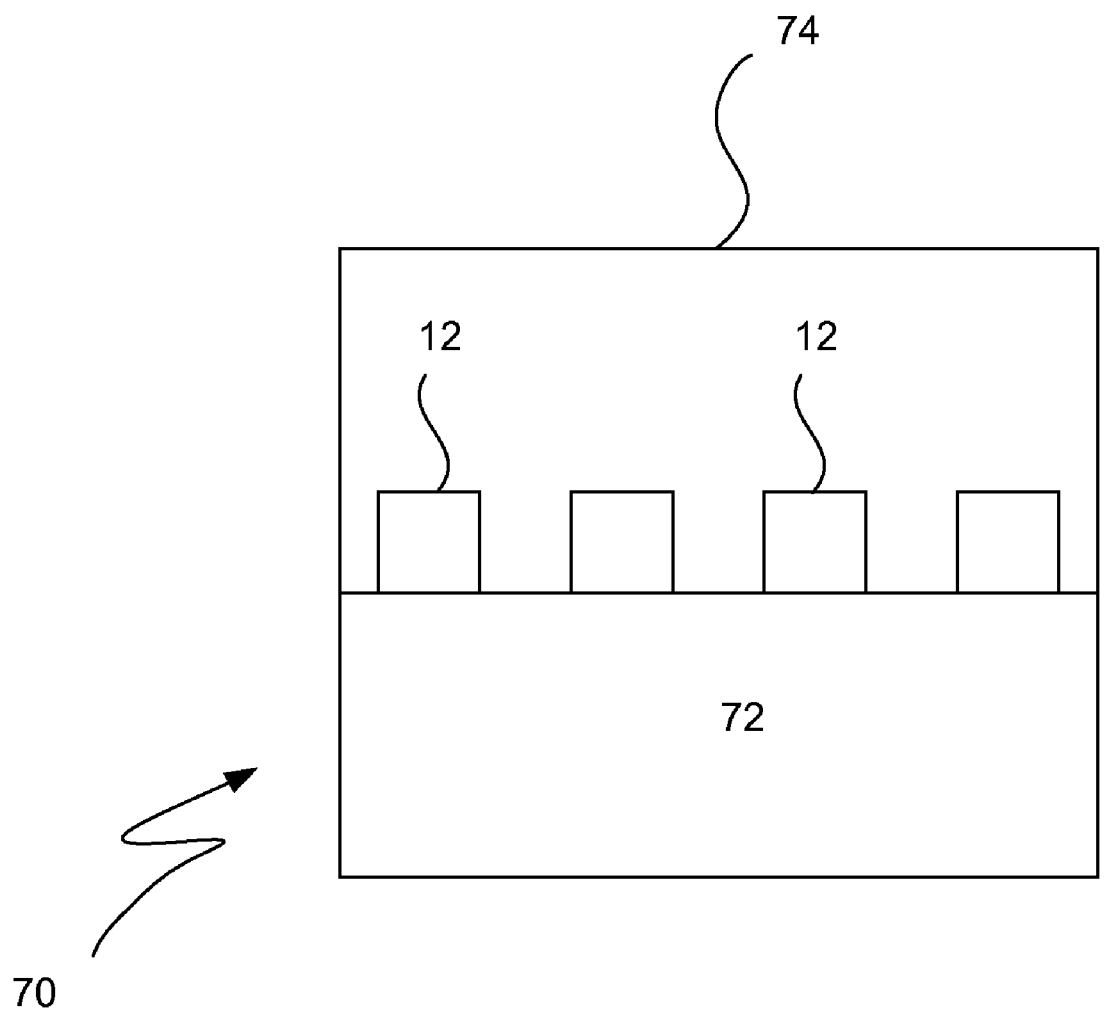
FIG. 7 is a cross section of one embodiment of a polymer waveguide structure that may be used in the molded lens structure of the present invention.

Referring to FIG. 7, a cross section of a polymer waveguide 70 according one embodiment of the present invention is shown. The waveguide 70 includes the bottom polymer cladding layer 72, the polymer cores 12 (and lenses 16, not illustrated) and the top polymer cladding layer 74 formed on the bottom cladding layer 72. In this embodiment, the bottom cladding layer 72 and the top cladding layer 74 provide structural integrity for the waveguide 70. In an alternative embodiment, the waveguide 70 can be formed on a substrate as well.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A polymer waveguide assembly, comprising:
   a polymer waveguide have a plurality of waveguide cores and an associated plurality of lenses respectively;
   a molded lens structure having a support region to support the polymer waveguide, a primary refractive lens and a secondary refractive lens, the plurality of waveguide cores, the primary refractive lens and the secondary refractive lens of the molded lens structure integrated into a single structure,
   wherein the plurality of waveguide lenses are in optical alignment with the primary refractive lens and the secondary refractive lens of the molded waveguide structure.

2. The assembly of claim 1, wherein the plurality of lenses of the polymer waveguide are capable of collimating in the X and Y plane.

3. The assembly of claim 1, wherein the primary refractive lens is capable of collimating light in the Z direction.

4. The assembly of claim 1, wherein the secondary refractive lens is capable of collimating light in the Z direction.

5. The assembly of claim 1, wherein the secondary refractive lens is positioned relative to the primary refractive lens and the plurality of waveguide lenses such that a substantial portion of the light passing through the secondary lens toward the waveguide cores is within the acceptance angle of the plurality of waveguides lenses respectively.

6. The assembly of claim 1, wherein the secondary refractive lens is positioned relative to the primary refractive lens and the plurality of waveguide lenses such that the secondary lens creates a shallow angle of convergence relative to the input of the plurality of lenses of the waveguide.

7. The assembly of claim 1, wherein the secondary refractive lens is positioned between the primary refractive lens and the plurality of lenses of the waveguide.

8. The assembly of claim 1, wherein the polymer waveguide comprises:
   a first polymer layer; and
   a second patterned polymer layer formed on the first polymer layer and patterned to form the plurality of waveguide cores optically aligned with the plurality of lenses.

9. The assembly of claim 8, wherein the first polymer layer is made of an optically transparent polymer having a index of refraction N1 and the second polymer layer has an index of refraction of N2, wherein N2 is greater than N1.

10. The assembly of claim 9, further comprising a third polymer layer formed over the second patterned polymer layer.

11. The assembly of claim 1, wherein the polymer waveguide comprises a first polymer layer, a second polymer layer and a third polymer layer, wherein the first polymer layer, the second patterned polymer layer, and the third polymer layer are made from an optically clear photopolymer consisting of: Polysiloxanes, Polymethylmethacylates, epoxies, and other materials or a combination thereof.

12. An apparatus, further comprising:
   a touch pad surface;
   two of the assemblies of claim 1 positioned on opposing sides of the touch pad surface respectively, the first assembly being configured as a transmit waveguide and the second assembly being configured as a receive waveguide.

13. The apparatus of claim 12, further comprising a processor optically coupled to the receive waveguide and a light source optically coupled to the transmit waveguide.

14. A method, comprising:
   providing a polymer waveguide have a plurality of waveguide cores and an associated plurality of lenses respectively;
   providing a molded lens structure having a support region, a primary refractive lens and a secondary refractive lens, the provided plurality of waveguide cores provided on the support region so that the primary refractive lens and the secondary refractive lens of the molded lens structure and the waveguide cores are integrated into a single structure,
   positioning the plurality of waveguide lenses on the support surface of the molded lens wherein the plurality of lenses of the polymer waveguide are in optical alignment with the primary refractive lens and the secondary refractive lens of the molded waveguide structure respectively.

15. The method of claim 14, wherein the plurality of lenses of the polymer waveguide are capable of collimating in the X and Y plane.

16. The method of claim 14, wherein the primary refractive lens is capable of collimating light in the Z direction.

17. The method of claim 14, wherein the secondary refractive lens is capable of collimating light in the Z direction.

18. The method of claim 14, wherein the secondary refractive lens is positioned relative to the primary refractive lens and the plurality of waveguide lenses such that a substantial; portion of the light passing through the secondary lens toward the waveguide cores is within the acceptance angle of the plurality of waveguides lenses respectively.

19. The method of claim 14, wherein the secondary refractive lens is positioned relative to the primary refractive lens and the plurality of waveguide lenses such that the secondary lens creates a shallow angle of convergence relative to the input of the plurality of lenses of the waveguide.

* * * * *